March 24, 1970     G. K. FLEURY     3,502,333
ELECTRONIC TRAP AND SKEET TARGET
Filed Oct. 4, 1967     4 Sheets-Sheet 1

INVENTOR
GLENDON K. FLEURY

BY *Aughrue, Rothwell, Mion, Zinn & Macpeak*

ATTORNEYS

March 24, 1970     G. K. FLEURY     3,502,333

ELECTRONIC TRAP AND SKEET TARGET

Filed Oct. 4, 1967     4 Sheets-Sheet 2

INVENTOR
GLENDON K. FLEURY

BY *Hughes, Rothwell, Mion, Zinn & Macpeak*

ATTORNEYS

March 24, 1970  G. K. FLEURY  3,502,333
ELECTRONIC TRAP AND SKEET TARGET
Filed Oct. 4, 1967  4 Sheets-Sheet 3

INVENTOR
GLENDON K. FLEURY

BY *signature*

ATTORNEYS

March 24, 1970  G. K. FLEURY  3,502,333
ELECTRONIC TRAP AND SKEET TARGET
Filed Oct. 4, 1967  4 Sheets-Sheet 4

INVENTOR
GLENDON K. FLEURY

BY *Sughrue, Rothwell, Mion, Zinn & Macpeak*

ATTORNEYS

United States Patent Office 3,502,333
Patented Mar. 24, 1970

3,502,333
ELECTRONIC TRAP AND SKEET TARGET
Glendon K. Fleury, 121 Ferguson Ave.,
Burlington, Vt. 05401
Filed Oct. 4, 1967, Ser. No. 672,820
Int. Cl. A63f 9/02
U.S. Cl. 273—101.1      12 Claims

ABSTRACT OF THE DISCLOSURE

A self-contained re-usable light detecting target adapted to simulate the trap or skeet type clay target having a disk shaped two part housing containing a photocell to detect incident light. The photocell triggers a battery powered alarm system which is capable of automatic or manual reset to provide a visual indication of a target hit.

---

This invention relates to targets adapted for use as a mark or point of aim in which indicating means for indicating a target hit are operated electrically. The target of the present invention is of the type adapted for freely traveling through the air such as that thrown from target-traps.

Skeet and trap shooting have heretofore utilized destructible "clay pigeons" or disks which are hurled into the air and fired at with conventional shotguns. A target hit is known by the disintegration of the clay disk when struck by the shotgun projectiles.

With the advent of light projecting cartridges, such as that disclosed in my co-pending application Ser. No. 650,389, filed June 30, 1967, entitled "Light Shot," target shooting has become safer, more enjoyable and more economical without any loss of skill or simulated actual conditions. Such light projecting cartridges, as pointed out in my aforesaid application may be readily used in a conventional rifle or shotgun without any modifications. In order to properly use the light projecting cartridge in target practice, it is desirable to provide a light responsive target which will indicate a target hit by some form of alarm system.

While light responsive targets employing some form of alarm system have been proposed in the prior art for use in conjunction with light emitting weapons, it has not been heretofore known to use such a target in trap or skeet type shooting.

The present invention therefore provides a non-destructible target system suitable for use in trap and skeet type shooting which is responsive to light emitted from a source and which is provided with an alarm system for indicating a target hit. This therefore enhances the safety, enjoyment and economics of trap and skeet shooting since accurate simulation of actual field shooting conditions may now be enjoyed without the use of projectile bearing weapons and the expense of the many destructible targets and cartridges required heretofore.

Summary of the invention

This invention provides a novel, transistorized alarm circuit triggered by a light responsive device in a moving flying target. The flying disk shaped target is provided with apertures in the target housing periphery which pass incident light from the outside of the housing to a photo-sensitive device which, when actuated, triggers the alarm circuit to indicate a target hit.

The features and advantages of the present invention will be apparent from the following description by way of the accompanying drawings, in which.

As illustrated in FIGURES 1 through 4, the substantially disk shaped target housing consists basically of two separable units, the upper electronic module 20 and the main housing 22. The upper electronic module 20 contains the electronic circuitry of the electro-bird, to be discussed below, and is secured to the main housing 22 by screws 24.

Figure 1:
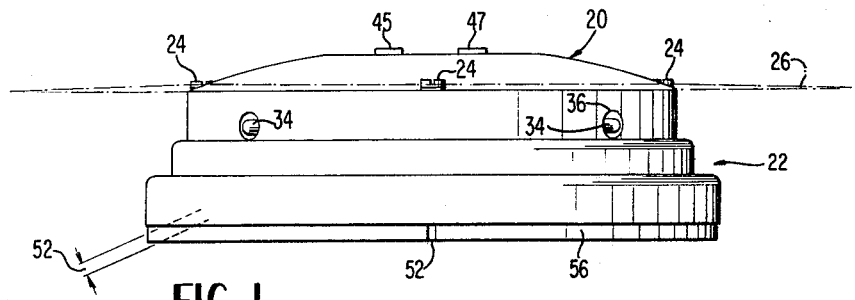
FIGURE 1 is a side view of the preferred embodiment of the assembled target of the present invention.
Figure 2:
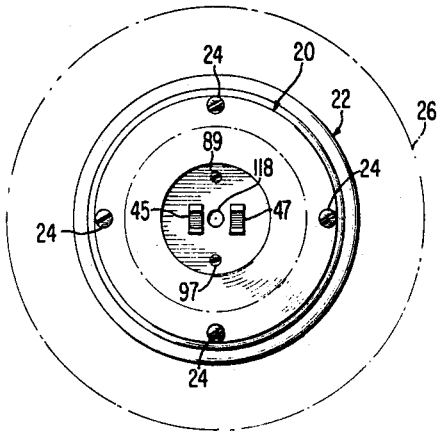
FIGURE 2 is a top plane view of the assembled target of the present invention.
Figure 4:
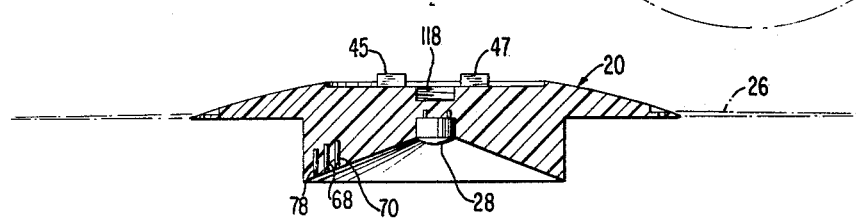
FIGURE 4 is a cross sectional view of the two part housing of the preferred embodiment of the present invention with the lower housing section taken along lines 4—4 of FIGURE 3.
Figure 4:
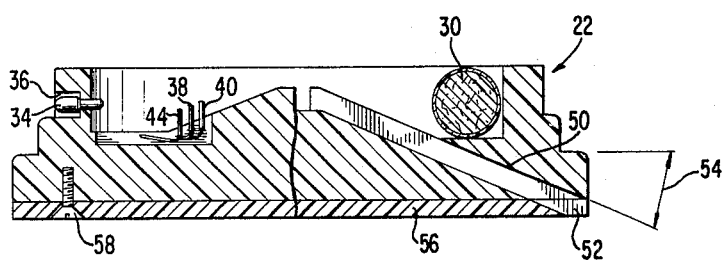
Figure 3:
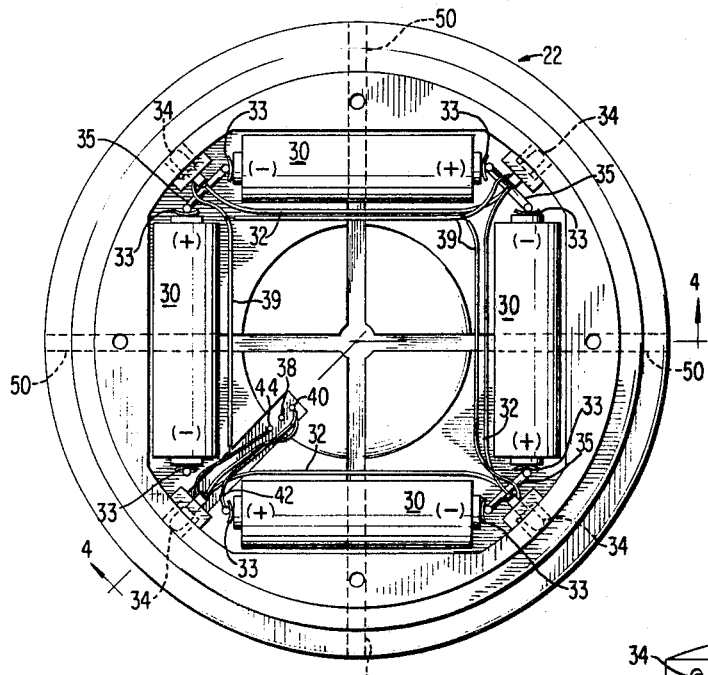
FIGURE 3 is a top view of the lower housing of the present invention.

In order to improve the stability of flight, a gliding disk adaptor 26 may be added to the housing as illustrated by the dashed lines of FIGURES 1 through 3 and secured thereto by screws 24.

The upper electronic module 20 is provided with a single photo-sensitive device 28 at the bottom central portion thereof. The photo-sensitive device 28 is in electrical contact with the electronic circuitry carried by the upper module 20.

The main housing 22 carries batteries 30 which are symmetrically arranged about the housing center. The batteries 30 are connected in series by spring clips 33 and springs 35 in a manner well known in the art and are thereby secured within the main housing 22. The series battery connection 30 has its positive terminal electrically connected to terminal pin 40 by wire 42 and the negative terminal connected to terminal pin 44.

One or more light emitting bulbs 34 are secured to the main housing 22 through apertures 36 extending through the sides thereof and are visible from the exterior of the electro-bird. Insulated wires 32 and 39 electrically connect the bulbs 34 in parallel with each other and to the terminal pins 40 and 38.

The main housing 22 is further provided with a plurality of radially spaced channels 50 which extend from the inner and upper central portion of the lower housing to the lower outer periphery thereof. These channels are directed such that when the upper housing 20 containing photo-sensitive device 28 is secured to the lower housing 22, the channels 50 terminate in the vicinity of the face of the photo-sensitive device 28. Thus, incident light striking one of the channels 50 will travel upwardly therethrough to the photo-sensitive device 28.

The channels 50 may be of any number and cross-sectional configuration such as rectangular, cylindrical, etc. and may have their inner surfaces polished in order to increase light reflectivity. The provision of a plurality of arc-shaped plates 56 secured to the underside of the main housing 22 by screws 58, allows a variety of channel width openings 52 to be made. Thus, if an inexperienced shooter were utilizing the present target, the size of openings 52 and the width of channels 50 would be chosen so as to expose the entire area of channels 50 whereas if a more experienced shooter were to use the target, he may desire a more accurate hit to trigger the target and thus would utilize larger arcuate sections 56 to decrease the opening 52 and the width of channels 50.

When the upper electronic module 20 and the lower housing 22 are assembled, the battery and light bulb pins 38 and 40 and 44 make electrical contact with corresponding sockets 68, 70 and 74 of the electronic module 20. When a pulse of light enters one or more of the channels 50, it is reflected up the channel to the photo-sensitive device 28 causing the electronic circuitry carried by module 20 to be activated resulting in a visual and/or audible hit indication.

Figure 8:
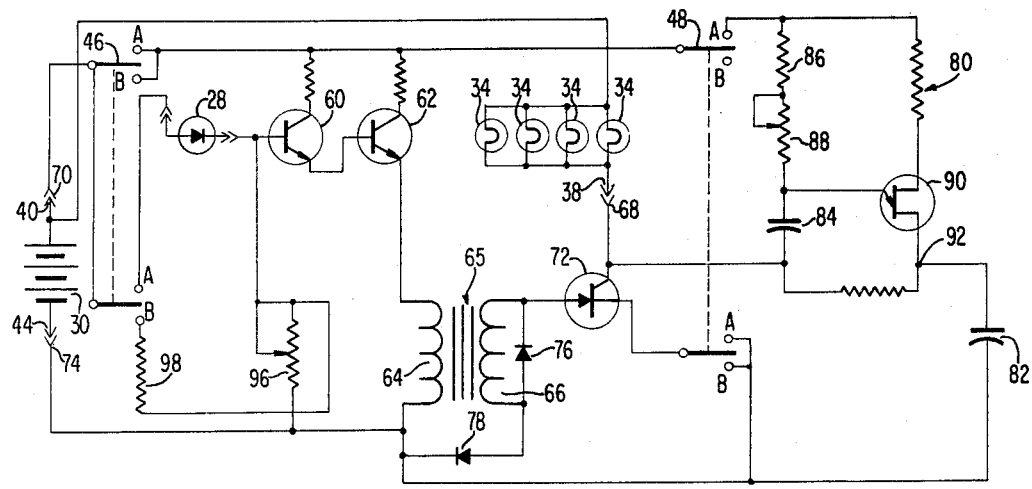
FIGURE 8 is a schematic of the electronic circuitry employed in the preferred embodiment of the present invention.
Figure 9:
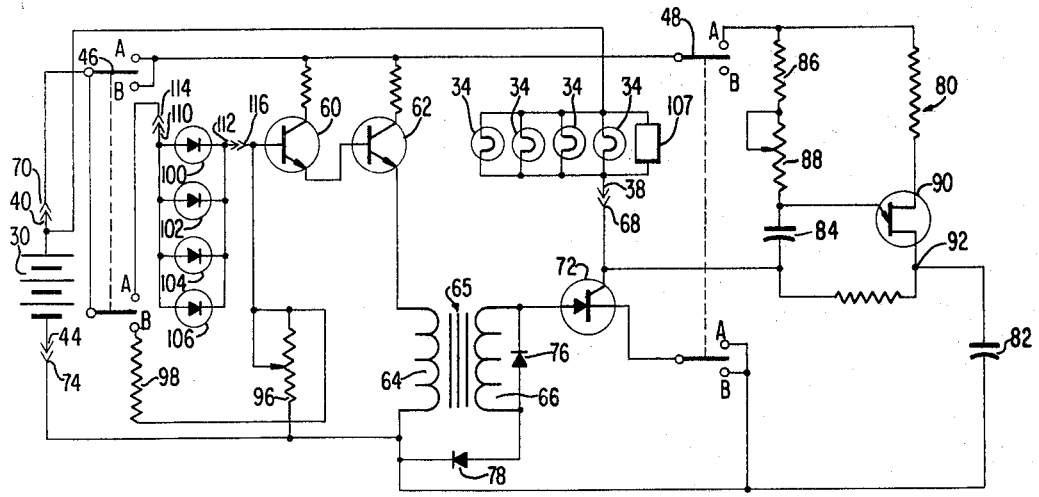
FIGURE 9 is a schematic of the electronic circuit employed in the alternative embodiment illustrated in FIGURES 5 through 7.

The electronic circuitry of module 20 is shown in FIGURES 8 and 9. Switch members 45 and 47 extending from the top of the electronic module 20 are set to close contacts 46 and 48 to position A. With contact 46 in this position, battery power is provided to the alarm circuit and photo-sensitive device 28. Contact 48 when closed to contact A connects the alarm turn off circuit 80 to the alarm circuit. The operation of the alarm circuit and the turn off circuit will now be discussed.

Referring to FIGURE 8, when a pulse of light hits the sensor 28, it lowers the resistance of the sensor element allowing a pulse of current to pass. This pulse of current induces a pulse signal to the base of transistor 60 causing it to conduct. This allows current to flow from the emitter of transistor 60 which supplies the necessary signal to the base of transistor 62 causing it to conduct and to feed a signal to the primary winding 64 of transformer 65. This surge of current through the primary 64 will induce a current in the secondary winding 66 which is fed to the gate of a silicon controlled rectifier 72 causing it to turn on and pass current through the alarm lights 34. The lighting of lights 34 indicates that a hit on the target has been made.

A diode 78 connected between the primary winding 64 and the secondary winding 66 acts to block any DC voltage in the primary 64 from getting to the secondary 66 and causing a premature triggering of the SCR 72.

When SCR 72 turns on, capacitor 84 begins charging through resistor 86, variable resistor 88 and SCR 72. The rate of build up on capacitor 84 is controlled by the variable resistor 88 which in turn controls the firing time of the turn-off circuit 80. When the charge on the capacitor 84 builds up to the threshold level of the unijunction transistor 90, the transistor 90 is triggered causing a substantial short around SCR 72 thereby reducing the current through SCR 72 to a value below the hold-on value. SCR 72 turns off and resets the circuit.

With the circuit automatically reset by turn off circuit 80, the target is now ready for reuse without additional adjustment. Thus, it can be readily observed that the target may be reused many times without requiring any manual changes or settings to be made after each use. The adjustable resistor 88 may be set to any desired value such that the duration of on time of alarm lights 34 may be readily controlled. An adjustment screw 89 is provided in the top of the electronic module 20 for the adjustment of resistor 88.

Variable resistor 96 connected between photo-sensitive device 28 and the battery supply 30 controls the amount of light required to trigger the circuit.

The gain setting pot 96 is adjustable by screws 97 in the top of the electronic module 20. This allows easy control of the amount of incident light necessary to trigger the photo-sensitive device to set the alarm. Therefore, only a simple adjustment of screw 97 is needed to compensate for ambient light conditions.

It should be noted that the light detecting circuit above described, when properly adjusted, works upon receipt of a pulse of light. The circuit does not employ any feedback technique which makes it critical to adjust. A slow build up of ambient light will not trigger the circuit because the transformer 65 will not pass a steady DC signal. However, the pulsed DC signal will be passed through the transformer 65 triggering the SCR 72.

If it is desired to have manual reset of the alarm system, rather than automatic reset, switch 48 may be moved to position B. This will disable the turn off circuit 80 and leave the alarm lights 34 on until they are manually reset. This may be a desirable feature when there is competition shooting so that there can be no question if a shooter hit the target.

For the purposes of self check in calibration, switch 46 may be switched to the B position which will disconnect the photo-sensitive device 28 from the circuit. Resistor 98 will then be connected across the battery supply 30 and the gain setting pot 96. By a proper choice of resistor 98, which can be selected for a given value of the photosensitive device 28 resistance change, a calibration point for the gain setting pot 96 may be made.

Figure 5:
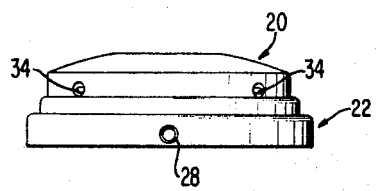
FIGURE 5 is a side view of the assembled target of an alternative embodiment of the present invention.
Figure 7:
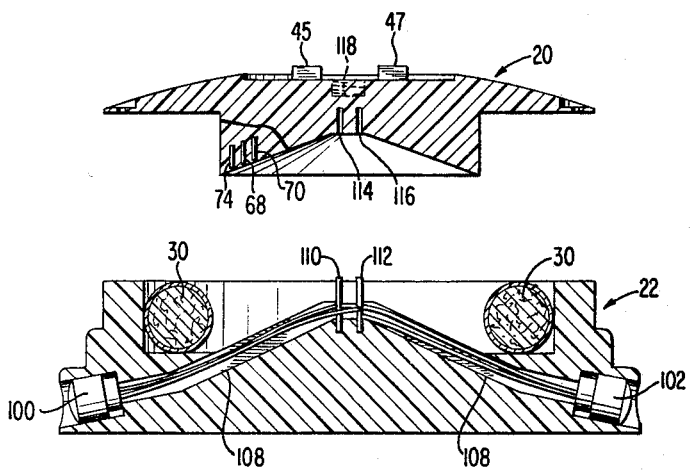
FIGURE 7 is a side cross sectional view of the two part housing of the alternative embodiment illustrated in FIGURES 5 and 6.
Figure 6:
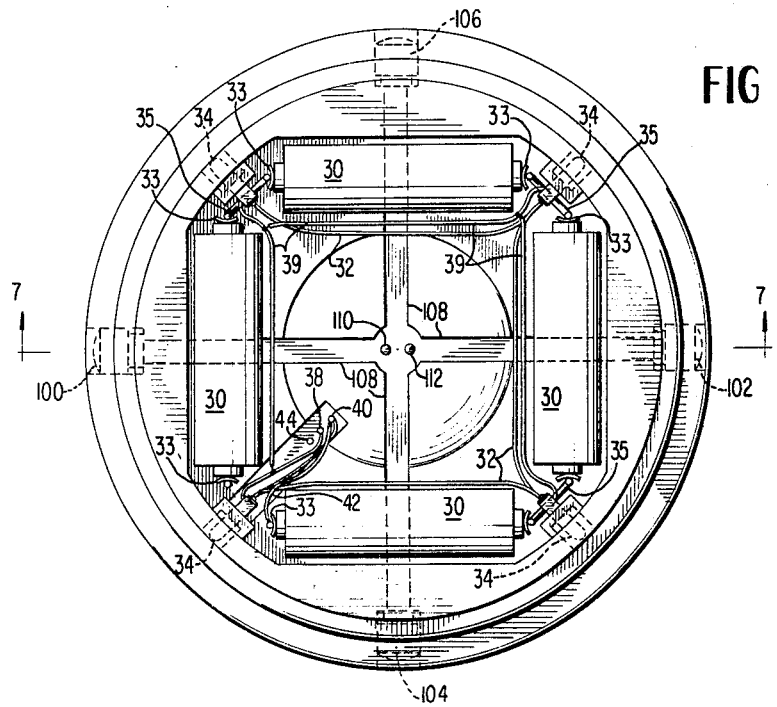
FIGURE 6 is a top view of the lower housing of the alternative embodiment of FIGURE 6.

In the alternative embodiment of the invention illustrated in FIGURES 5 through 7, four photo-sensitive devices 100, 102, 104 and 106 are provided rather than the single photo-sensitive device utilized in FIGURES 1 through 4. This increases the sensitivity of the target system and allows it to respond to a much lower level. The area and angle 54 of opening 52 in front of the sensors 100, 102, 104 and 106 can be varied to accommodate various shooting conditions such as ambient light and shooting angles while four sensors have been illustrated in this embodiment, it is obvious that an increase or decrease in the number of photosensitive devices and channels 50 could be provided.

The four sensor wire connections are brought up through the radial channels 108 to pin connections 110 and 112. Cooperating pin sockets 114 and 116 in the upper module 20 electrically connect the photo-sensitive devices to the electronic target detecting circuit.

The remaining parts of the alternative embodiment illustrated in FIGURES 5 through 7 are identical with those of the preferred embodiment discussed above and are indicated by like reference numerals.

The electronic circuitry employed in the modified embodiment illustrated in FIGURES 5 through 7 is schematically shown in FIGURE 9. The operation of this circuit is identical to the afore-described operation of the electronic circuit illustrated in FIGURE 8, with the exception of the single photo-sensitive device being replaced by four photo-sensitive devices connected in parallel, and by the inclusion of an audible alarm 107 connected in parallel with the illuminating bulbs 34. In this embodiment, when incident light strikes one of the photo-sensitive devices 28, not only will the light bulbs 34 be illuminated to indicate a hit, but also the alarm 107 will be triggered to give an audible indication of a target hit. Of course, such an audible alarm could readily be provided in the circuit of FIGURE 8.

The light responsive target of the present invention could easily be adopted for night use simply by modifying the electronic circuitry so that the bulbs 34 would be turned on prior to launch and the photo-sensitive device would trigger the alarm circuit to turn the lights off to indicate a target hit. The alarm turn off circuit 80 would then act to turn the bulbs 34 back on after a predetermined time so that the target could be visible for retrieval and subsequent reuse.

In use, the electro-bird is projected into the air by a target-trap or the like, and the shooter aims his gun at the flying electro-bird and pulls the trigger to emit a beam of light therefrom. If the beam of light strikes the target, the photo-sensitive device will pick up the incident light and trigger the alarm circuit to indicate a hit.

There are three basic methods employed in trap or skeet-type shooting. The first is the snap method wherein the shooter does not aim his gun directly at the target, but aims at some point ahead of the target where he thinks the target will be when the simulated shot charge would reach that point. That is, he aims at a lead point which allows compensation for the target velocity and the time of flight of the shot charge from the weapon to the target. In this method, the shooter must utilize some type of delayed light emission from the gun since the speed of light over relatively short distances is essentially instantaneous. A suitable delayed light emission device is disclosed in my aforesaid co-pending application Ser. No. 650,389 filed June 30, 1967 entitled "Light Shot."

Figure 10:
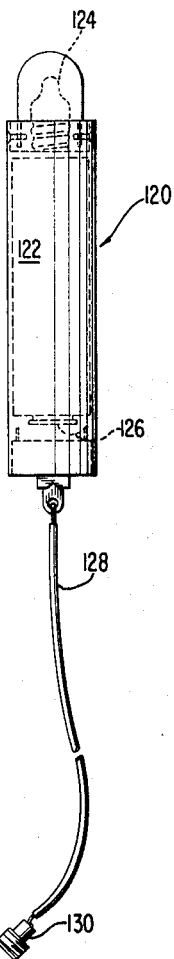
FIGURE 10 is an illustration of the battery operated lead adaptor light which may be attached to the electro-bird of the present invention.
Figure 11:
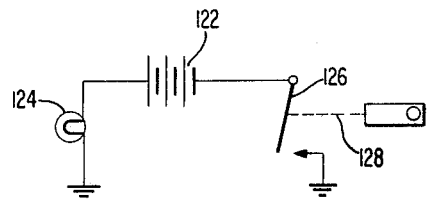
FIGURE 11 is a schematic of the circuit employed in the lead adaptor of FIGURE 10.
Figure 12:
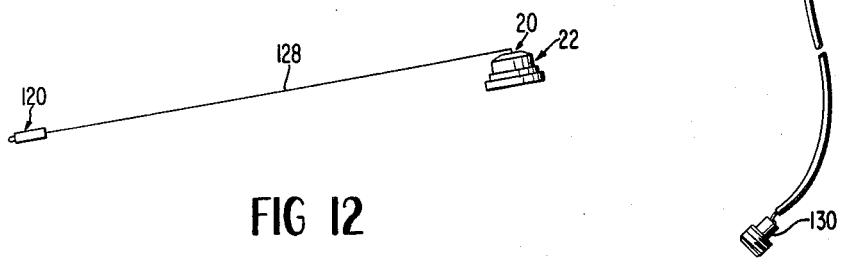
FIGURE 12 is an illustration of the lead adaptor attached to the electro-bird of the present invention.

The swing through method and the sustained lead method require the addition of a lead adaptor such as shown in FIGURES 10 through 12. The lead adaptor 120 is basically a one-cell flashlight comprising a battery 122, a light bulb 124 and a modified switch 126. The switch 126 is a normally open switch which is closed when tension is applied to the cord 128 extending rearwardly therefrom. At the end of the cord 128 is a swivel nut 130 which is adapted to screw into aperture 118 provided in the electronic module 20. The swivel nut 130 allows the electro-bird to rotate freely without twisting up the lead adaptor cord 128 as it trails behind the flying target. When the electro-bird is launched, a slight tension will be applied to cord 128 which will close switch 126 and illuminate bulb 124. FIGURE 11 illustrates a schematic of the wiring diagram employed by the lead adaptor.

In the sustained lead method of shooting, the lead adaptor 120 is attached to the electro-bird and the electro-bird and adaptor are launched. The shooter then swings past the lead adaptor and aims his gun at the electro-bird. He the pulls the trigger, and with no delay of light emission from the gun such as that discussed above concerning the snap method, the light pulse is emitted immediately and the shooter scores a hit if his aim is still on the electro-bird. Under these conditions, the electro-bird actually represents the imaginary lead point that the shooter would have to pick to hit his target while the lead adaptor represents the actual target. The proper compensation for target velocity and shot charge time of flight is achieved by determining the length of cord 128 necessary to simulate these parameters.

The swing through method requires some type of controlled delayed light emission from the gun. The lead adaptor, having a cord length designed to compensate for the target velocity and shot charge time of flight is attached to the electro-bird. When the electro-bird and adaptor are launched and appear to the shooter, he swings onto the electro-bird adaptor from behind and increases his swing by the amount needed to overcome the target and to give him the proper lead. He then pulls the trigger just as the line of sight is passing the electro-bird adaptor. However, because of the delay in light emission, a pulse will not be emitted until a predetermined time after the trigger is pulled, at which time if the shooter has properly tracked and followed through, his gun will be pointing on the electro-bird, not the adaptor, thereby making a hit.

Thus, the electro-bird of the present invention when combined with a lead adaptor may be successfully employed in all types of skeet and trap-type shooting with accurate simulation of actual field conditions. While it is desirable to employ an adjustable delayed light emission system in conjunction with the gun used by the shooter, it is of course possible to utilize instantaneous light emission systems without a loss of accuracy when using the sustained lead method of shooting.

While the invention has been particularly shown and described with reference to a preferred embodiment, it will be understood by those skilled in the art that various changes in form and details may be made without departing from the spirit and scope of this invention.

What is claimed is:

1. An electronic target apparatus for use with a light projecting gun comprising a re-usable, self contained target means capable of being thrown through the air, said target means being disc shaped to provide a stable flight path; light receptive means contained within said target responsive to an increase of incident light impinging on said target and indicating means within said target activated by said receptive means for providing a sensory indication of a target hit.

2. An electronic target as in claim 1 wherein said sensory indication is a light alarm.

3. An electronic target as in claim 1 wherein said sensory indication is an audible alarm.

4. An electronic target apparatus as in claim 1, wherein a trailing target means is operatively connected to said target means to provide compensation for the relative speed of the projecting light as compared to the speed of a projectile.

5. An electronic target as claimed in claim 1 wherein said means for providing a sensory indication comprises, a voltage source, an electrically responsive alarm, a normally open switch connected in series with said source and said alarm, and circuit means responsive to light from a light projecting gun hitting said target for closing said switch.

6. An electronic target as in claim 5 wherein said target is further provided with circuit means adapted to turn off said switch a predetermined time after it is turned on.

7. An electronic target as in claim 6 wherein said circuit means is adjustable to compensate for varying ambient light conditions.

8. An electronic target apparatus as in claim 1, wherein said light receptive means are located on the bottom of said disc-shaped target means.

9. An electronic target for use with a light projecting gun comprising a housing, means in said housing responsive to an increase of incident light impinging on said housing for providing a sensory indication of a target hit, said indicating means comprising a voltage source, an electrically responsive alarm, a normally open silicon controlled rectifier switch connected in series with said source and said alarm and circuit means responsive to light from a light projecting gun hitting said target for closing said switch, said circuit means comprising a transistorized amplifier, a photosensitive device connected between said source and said amplifier for providing a current pulse input to said amplifier when hit by a pulse of light, a transformer having primary and secondary windings, said primary windings connected to the output of said amplifier and said secondary winding being connected to the controlling gate input of said silicon controlled rectifier.

10. A target as claimed in claim 9 wherein said housing is substantially disc shaped, said photosensitive device is centrally positioned in said housing, and said housing includes plural optical channels leading from different points on said housing periphery to said photosentitive device.

11. A target as claimed in claim 9 wherein said housing is disc shaped, said photosensitive device comprises plural photosensitive elements electrically connected in parallel and positioned in different slots respectively arranged around the periphery of said housing.

12. A target as claimed in claim 11 wherein said disc-shaped housing is provided with means for attaching a gliding disc adaptor.

References Cited

UNITED STATES PATENTS 2,148,063   2/1939   Evans _____ 273—105.4

(Other references on following page)

| UNITED STATES PATENTS | | |
|---|---|---|
| 2,795,778 | 6/1957 | Bagby. |
| 3,185,830 | 5/1965 | Mills et al. _____ 273—101.1 X |
| 3,294,401 | 12/1966 | Nicholas et al. _____ 273—101.1 |
| 3,401,939 | 9/1968 | La Mura. |
| 367,748 | 8/1887 | Ferguson et al. _____ 273—105.4 |
| 425,732 | 4/1890 | Best _____ 273—105.4 |
| 2,174,813 | 10/1939 | Younghusband __ 273—101.1 X |

| FOREIGN PATENTS | | |
|---|---|---|
| 1,286,057 | 1/1962 | France. |
| 644,953 | 9/1962 | Italy. |

ANTON O. OECHSLE, Primary Examiner

MAX R. PAGE, Assistant Examiner

U.S. Cl. X.R.

273—105.4, 107.2